United States Patent [19]

Ishii

[11] 3,885,143

[45] May 20, 1975

[54] OPTICAL INFORMATION RETRIEVAL APPARATUS

[75] Inventor: Akira Ishii, Kawasaki, Japan

[73] Assignee: Nippon Telegraph and Telephone Public Corporation, Tokyo, Japan

[22] Filed: Nov. 15, 1973

[21] Appl. No.: 416,306

[30] Foreign Application Priority Data

Nov. 17, 1972 Japan .............................. 47-114748

[52] U.S. Cl. ........... 235/181; 340/173 LM; 350/3.5

[51] Int. Cl. ......................... G06g 9/00; G11c 11/42

[58] Field of Search ...................... 235/181; 350/3.5; 340/173 LT, 173 LS, 173 LM, 146.3 F, 146.3 G, 146.3 P, 146.3 Q, 146.1 AB

[56] References Cited

UNITED STATES PATENTS

| | | | |
|---|---|---|---|
| 3,703,137 | 11/1972 | Anderson et al. | 340/173 LM |
| 3,706,080 | 12/1972 | Tzuo | 340/173 LM |
| 3,720,453 | 3/1973 | Lee et al. | 340/173 LM |
| 3,720,923 | 3/1973 | Chen et al. | 340/173 LM |
| 3,767,285 | 10/1973 | Mezrich | 340/173 LM |
| 3,798,618 | 3/1974 | Oshida | 340/173 LM |

FOREIGN PATENTS OR APPLICATIONS

| | | | |
|---|---|---|---|
| 1,233,007 | 5/1971 | United Kingdom | 235/181 |

OTHER PUBLICATIONS

Becker: Laser burnt tape leads to Mass Memory System, Electronic News, Jan. 23, 1967, page 4.

Anderson: Holographic Optical Memory for Bulk Data Storage, Bell Laboratories Record, Nov. 1968, pp. 318–325.

Peters et al.: Signal Recorder – Reproducer Using a Coherent Light Source and Photographic Film Record. Proceedings of the IEEE, Vol. 58, No. 6, June 1960, pp. 886–893.

*Primary Examiner*—Felix D. Gruber

*Attorney, Agent, or Firm*—Sughrue, Rothwell, Mion, Zinn & MacPeak

[57] ABSTRACT

An optical information retrieval apparatus which utilizes the correlation detection function of a hologram to check coincidence matching between an interrogation signal and information recorded in a hologram memory is provided with an acousto-optic deflector serving as an input means for the interrogation signal. Both the interrogation signal and the hologram memory information are represented in the form of an M-out-of-N code, and identification of coincidence matching therebetween is effected on code-by-code basis. The interrogation signal to be digitally coded is applied through the acousto-optic deflector to an optical system for identification of coincidence matching. The acousto-optic deflector is driven by M different electric inputs having M different frequencies selected from N different frequencies so that a laser light beam incident onto the deflector is spatially modulated to simultaneously produce M deflected beams in M different directions determined by the M different driving frequencies, each of the deflected beams representing a "1" bit of an M-out-of-N code. The M deflected beams have differences in frequency corresponding to the differences between the individual driving frequencies, respectively, because upon deflection each of the deflected beams is deviated in frequency from the frequency of the incident laser beam by the amount of the corresponding driving frequency among the M driving frequencies. The M deflected beams representing an interrogation code are focussed onto the hologram to check coincidence matching between the interrogation code and the digitally coded hologram memory information. The result of coincidence matching occurs in diffracted light outputs from the hologram and is detected by photo diodes. The deflected light beams which were diffracted by the hologram are incident onto the photo diodes, and, consequently, due to an optical heterodyne phenomena, one or more beat outputs having one or more beat frequencies corresponding to the differences in frequency of the incident light beams can be obtained at the outputs of the photo diodes. If there exists coincidence matching between the interrogating and the interrogated codes, M different light beams having M different frequencies, respectively, impinge onto the photo diodes, while light beams having different frequencies in number equal to or less than (M-1) irradiate onto the photo diodes when no coincidence exists between the interrogating and the interrogated codes. Accordingly, for coincidence or non-coincidence the frequency components of the beat outputs differ, which means that the presence or absence of coincidence can be detected by analyzing the frequency of the beat outputs. When a 2-out-of-N code is used as an example of an M-out-of-N code, a beat output appears only upon existence of coincidence, rendering the simplest identification of coincidence matching.

In order to accomplish the above described method of coincidence matching detection, the optical information retrieval apparatus comprises, in combination, a laser light source, an acoustooptic deflector for coding a laser light beam by an interrogation signal, a hologram memory array storing coded information to be retrieved whether coincidence exists or not, a photo diode array for detecting output lights upon presence of coincidence matching, an optical system arranged for transmitting the coded light pattern to the photo diode array through the hologram, and electronic circuit means responsive to the outputs of the photo diode array for frequency-analyzing the latter to detect presence or absence of coincidence.

6 Claims, 17 Drawing Figures

FIG_7
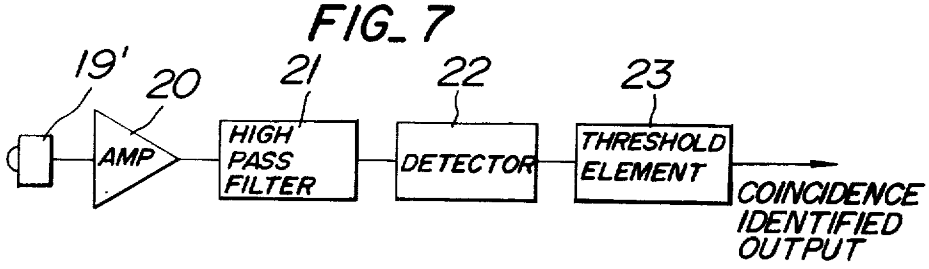
FIG_8
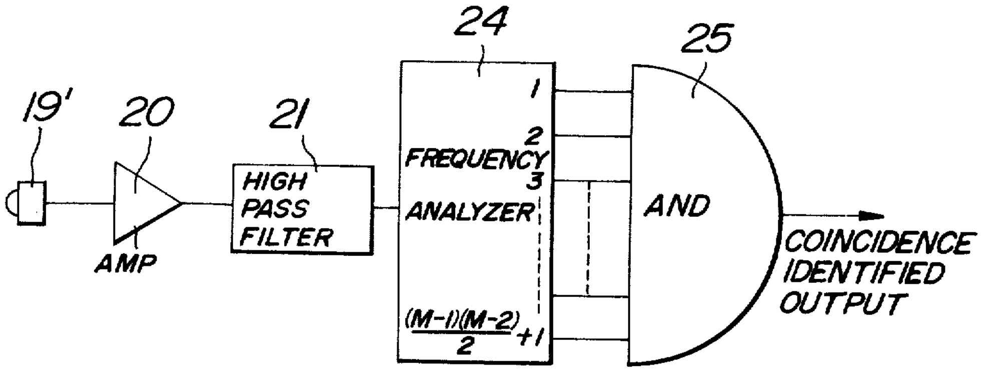
FIG_9
| | | | | | | | | | | | | | |
|---|---|---|---|---|---|---|---|---|---|---|---|---|---|
| O | X | X | X | O | X | X | X | O | X | X | O | X | X |
| O | O | X | X | X | O | X | X | O | O | X | X | O | X |
| X | O | O | X | X | X | O | X | X | O | O | O | X | O |
| X | X | O | O | O | X | X | O | X | X | O | X | O | X |
| O | X | X | O | O | O | X | X | X | X | X | X | X | O |
| X | O | X | X | X | O | O | X | O | X | X | O | X | X |
| X | X | O | X | X | X | O | O | X | O | X | X | O | X |
| X | X | X | O | X | X | X | O | X | X | O | X | X | O |
| | | | | | | | | | | | | | |
|---|---|---|---|---|---|---|---|---|---|---|---|---|---|
| O | X | X | O | X | X | O | X | O | X | O | O | O | O |
| X | O | X | X | O | X | O | O | X | O | O | X | X | X |
| X | X | O | X | X | O | X | O | X | X | X | X | X | X |
| O | X | X | X | X | X | X | X | X | X | X | O | X | X |
| X | O | X | O | X | X | X | X | X | X | X | X | O | X |
| O | X | O | O | O | X | X | X | O | X | X | X | X | X |
| X | O | X | X | O | O | O | X | O | O | X | X | X | O |
| X | X | O | X | X | O | X | O | X | O | O | O | O | O |

OPTICAL INFORMATION RETRIEVAL APPARATUS

BACKGROUND OF THE INVENTION

The present invention relates to optical information retrieval apparatus which utilize the correlation detection function of a hologram to detect coincidence matching between an interrogation signal and the information stored in a hologram memory so that retrieval of desired information can be achieved, and more particularly to optical information retrieval apparatus employing a light deflector based on an acousto-optic effect for modulating an original laser light beam by an interrogation signal.

Such an optical information retrieval apparatus was disclosed in my copending U.S. Pat. Application Ser. No. 217,157 filed Jan. 12, 1972, and now U.S. Pat. No. 3,832,698, issued Aug. 27, 1974. In the apparatus disclosed in that patent, an interrogation signal serving as a correlation detection input is coded by using a shutter array including a plurality of shutters spatially arranged so that they can control passing of an incident laser light beam therethrough by a combination of the opening and closing of the relevant shutters. To realize such a shutter array, optical switches comprising crystals having electro-optical effect, liquid crystal displays, electromagnetic shutters, etc., have been used. However, such shutters need high control voltages or currents, or their operating speed is slow enough so that they are not sufficient for input means for an interrogation signal to an optical information retrieval system. As described in my aforementioned patent, correlation detection can be accomplished with high accuracy by using a 2-out-of-N code. In the copending patent, coding of an interrogation signal into a 2-out-of-N code is effected by the aid of the shutter array so that the latter is irradiated uniformly by a laser light beam, and the coded beam pattern passed through the shutter array is incident onto an information retrieval optical system of for checking coincidence matching. In this method, only two out of N shutters are opened with the remaining (N−2) shutters kept closed, and hence the ratio of a fractional light beam which is a penetrating light to the laser beam irradiated onto the shutter array becomes less than 2/N, resulting in very low efficiency during coding operation.

OBJECTS OF THE INVENTION

The present invention obviates the above-mentioned disadvantages of the known optical information retrieval apparatus due to coding of the interrogation signal by the shutter array.

One object of the present invention is to provide an optical information retrieval apparatus comprising input means for an interrogation signal with higher efficiency and a coincidence checking device with higher accuracy.

A further object of the invention is to provide an optical information retrieval apparatus which comprises an acousto-optic deflector serving as the input means for an interrogation signal.

Another object of the invention is to provide an information display device which improves availability of the laser light beam for information display and operates at very high speed as compared with conventional devices using a shutter array.

SUMMARY OF THE INVENTION

In accordance with the invention, an optical information retrieval apparatus comprises a light deflector utilizing optical diffraction phenomena with ultrasonic waves (hereinafter referred to as an acousto-optic deflector) as an input means for an interrogation signal for the correlation detection.

The optical information retrieval apparatus of the invention is characterized by comprising a first optical system for checking coincidence matching and a second optical system for reading-out desired information. The apparatus operates so as to carry out the checking of coincidence matching between the interrogation signal and the hologram memory information, both of which are coded in the form of M-out-of-N code, by virtue of the correlation detection function of a hologram, the coincidence checking optical system including a laser light source generating a coherent light, a modulator for coding the interrogation signal in the form of M-out-of-N code, a hologram array in which information to be retrieved is stored in M-out-of-N coded form, means for scanning the hologram array by controlling deflection of the coded interrogation light pattern from the modulator, a photo detector array for detecting coincidence matching output light, and electric circuit means for detecting from the output of the photodetector array an A.C. component indicative of coincidence matching between the interrogation code and the coded hologram memory information.

BRIEF DESCRIPTION OF THE DRAWINGS

The foregoing and other objects, features, and advantages of the invention will be apparent from the following more particular description of preferred embodiments of the invention as illustrated in the accompanying drawings:

FIG. 7 is a block diagram of an identification circuit for coincidence matching output when a 2-out-of-N code is used;

FIG. 8 is a block diagram of an identification circuit for coincidence matching output when an M-out-of-N code is applied;

FIG. 9 is a list of 3-out-of-8 codes with which an identification beat frequency $\nu a$ can be obtained;

DETAILED DESCRIPTION OF THE PREFERRED EMBODIMENTS

Figure 1:
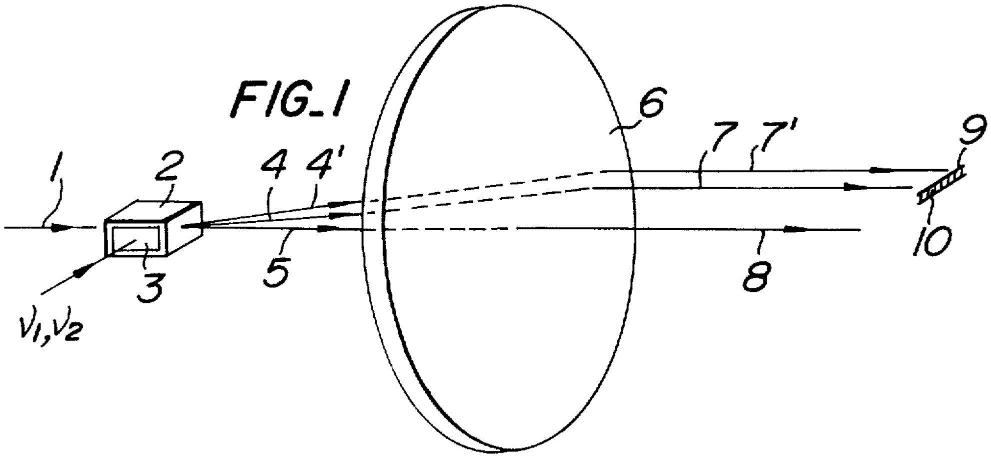
FIG. 1 is a schematic illustration of coding an interrogation signal by means of an acousto-optic deflector.

Referring to FIG. 1, there is shown an embodiment of the invention in which coding of an interrogation signal is effected by employing an acousto-optic deflector. In FIG. 1 reference numeral 1 designates a laser light beam from a laser light source not shown, and 2 is a medium in which ultrasonic waves can propagate. The medium 2 may be made of, for example, a tellurium dioxide single crystal or optically homogeneous glass. Numeral 3 is a transducer for converting electrical inputs into ultrasonic waves, and 4 and 4' are a set of deflected laser beams, while 5 is a laser light beam which has passed directly through the medium 2 without deflection. The laser light 5 is referred to as a zero-order light. Numeral 6 represents a lens for transforming angularly deflected laser beams into positionally deflected ones. The medium 2 is located on the focal plane of the lens 6. Numerals 7 and 7' denote positionally deflected laser beams, and 8 is a zero-order light beam concentrated by the lens 6. Numeral 9 is a mask having a plurality of apertures 10 which are equal in total number to the number of required deflection points or directions so as to remove spurious lights other than the deflected light beams. The mask 9 is placed on the other focal plane downstream of the lens 6. If an interrogation signal consisting of a pair of ultrasonic waves having frequencies $\nu_1$ and $\nu_2$, respectively, is applied through the transducer 3 so as to propagate in the medium 2, parts of the laser beam 1 are subjected to diffraction while the remaining part of the laser beam 1 passes directly through the medium 2 resulting in the zero-order light beams 5 and 8. As the intensity of the ultrasonic wave input increases, the intensity of the zero-order light beam 5 decreases on the one hand and the intensity of the diffracted light increases on the other hand. For the respective ultrasonic waves of the frequencies $\nu_1$ and $\nu_2$, the diffracted lights 4 and 4' having diffraction angles of $\lambda\nu_1/Va$ and $\lambda\nu_2/Va$ with respect to the zero-order light are produced, respectively, wherein Va is the propagation velocity of the ultrasonic wave in the medium 2.

Figure 2:
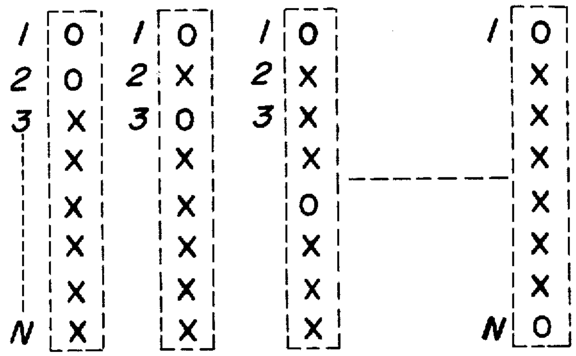
FIG. 2 is a symbolic illustration of a 2-out-of-N code pattern in the form of light spots in line wherein o marks represent bright spots corresponding to "1" bits and × marks dark spots corresponding to "0" bits, respectively.

It should be noted that, as an example, simultaneous generation of two deflected lights through two ultrasonic waves of two different frequencies has been described hereinabove, but, in general, M different deflected lights can be produced simultaneously by ultrasonic waves having M different frequencies. According to the invention, both an interrogation signal and a hologram memory information unit are coded previously in the form of a 2-out-of-N code or, more generally, an M-out-of-N code constituting each unit of information. The 2-out-of-N code is represented in the form of a bit pattern with a line of light spots as illustrated in FIG. 2. Among N light spots, two spots are chosen as bright spots (as indicated by o marks) so that they represent two 1 bits whereas the remaining (N−2) spots are dark spots (as indicated by × marks) which represent 0 bits. Thus, N(N−1)/2 different codes can be obtained from various positional combinations of two bits selected as bright spots. Decimal numbers shown in FIG. 2 indicate the position numbers of the corresponding bits. Similarly, in the M-out-of-N code pattern, M bit positions are selected as bright spots and $N(N-1)\ldots(N-M+1)/M!$ different codes are obtained. If these codes are fed as interrogation signals to a character coincidence identification optical system, the above-mentioned operational principle of the acousto-optic deflector can be utilized.

When, among a series of N frequencies $\nu a$, $2\nu a \ldots N\nu a$ of equi-distance on the frequency spectrum, two ultrasonic waves having any two different frequencies $m\nu a$ and $n\nu a$ ($m, n = 1, 2, \ldots N$) selected therefrom are applied through the transducers 3 to the medium 2, two light spots which represent two spatially separated 1 bits can be obtained by directing the laser beam into the corresponding two deflection positions out of the N possible deflection positions. This enables the 2-out-of-N code to be represented optically. In this method, if the efficiency of the light deflector with which the incident laser light is converted into the deflected lights 4 and 4' is sufficiently high, the laser beams are concentrated without excessive loss into the light spots representing 1 bits, so that availability of the laser beams upon coding an interrogation signal is improved as compared with conventional shutter arrays, and an information display device operating at very high speed can be realized in comparison with prior art display devices using shutter arrays because the acousto-optic deflector provides a short response time in the order of micro seconds.

In the case of an M-out-of-N code, M different frequencies in number are chosen from N different frequencies and are fed into the acousto-optic deflector so that M deflected beams are produced and may be used for representing any corresponding codes. One of the great differences between representation of the interrogation signal by the shutter array according to my previously mentioned patent and representation of the interrogation signal by the acousto-optic deflector disclosed herein is that, in the former case, all frequencies of beams indicating 1 bits are the same as the frequency of this light source, while, according to the invention, the various diffracted beams representing 1 bits have different frequencies. The individual diffracted beams are produced through diffraction of the laser light by ultrasonic waves of different frequencies. Upon diffraction by ultrasonic waves, the laser light is subject to frequency shift due to a so-called Doppler effect. The magnitude of that frequency shift is equal to a frequency of an ultrasonic wave input. Therefore, each of the 1 bits of an interrogation code provided by the acousto-optic deflector presents a corresponding difference in frequency of the ultrasonic wave.

Figure 3:
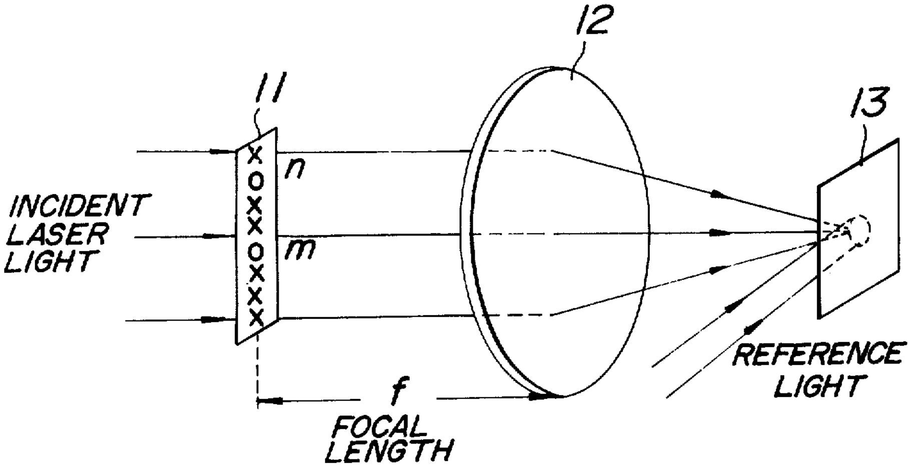
FIG. 3 is a schematic illustration of providing hologram storing information to be retrieved in the form of a 2-out-of-N code (N=8) by using a shutter array.
Figure 4:
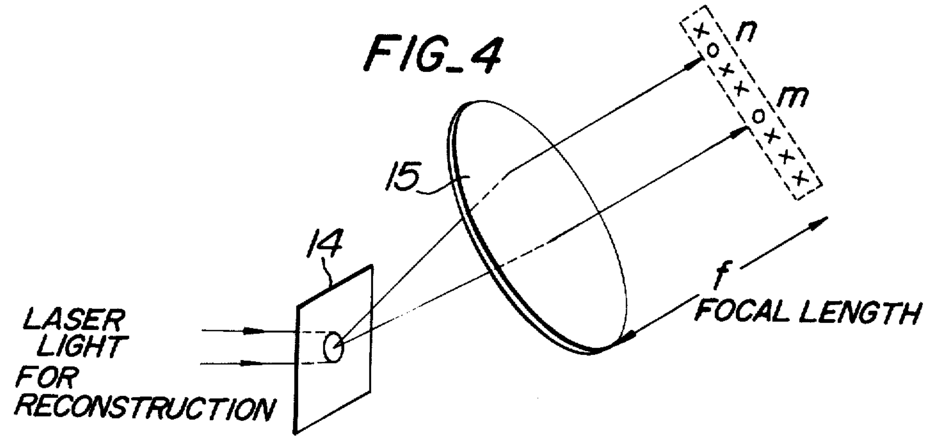
FIG. 4 is a schematic view of reproducing stored information codes by illuminating holograms with reconstructing light beams.

Now, it will be explained how optical coincidence identification is carried out between interrogation codes consisting of 1 bits of different frequencies according to the invention and coded information recorded in a hologram. FIG. 3 shows schematically a known optical system with which the hologram memory information is recorded in the form of a 2-out-of-N code (as an example, N=8) by opening or closing the shutters of a shutter array 11. In this figure, opened shutters provide 1 bits (shown by o marks), and closed shutters provide 0 bits (shown by × marks). The shutter array 11 receives a beam of laser light of illumination, and coded information from the shutter array 11 is subjected to an optical Fourier transform through a Fourier-transform lens 12 and then projected onto a photographic plate 13. Also, another beam of laser light derived from the same light source as the beam of laser light used for irradiation of the shutter array is incident onto the photographic plate 13, and the last-mentioned laser light beam interferes with the Fourier transformed code pattern of the shutter array 11 on the photographic plate 13, so that an interference fringe is recorded on the photographic plate 13 after the developing process so as to form a coded memory. The second beam of laser light is termed a "reference light". FIG. 4 illustrates schematically the reproduction process of a code recorded as a line of light spots by irradiating a hologram 14 with a laser light for reconstruction. The numeral 15 denotes an imaging lens. In the examples of FIGS. 3 and 4, the recorded code is shown as having binary values 1 at the mth and nth bit positions (as indicated by o marks).

Figure 5:
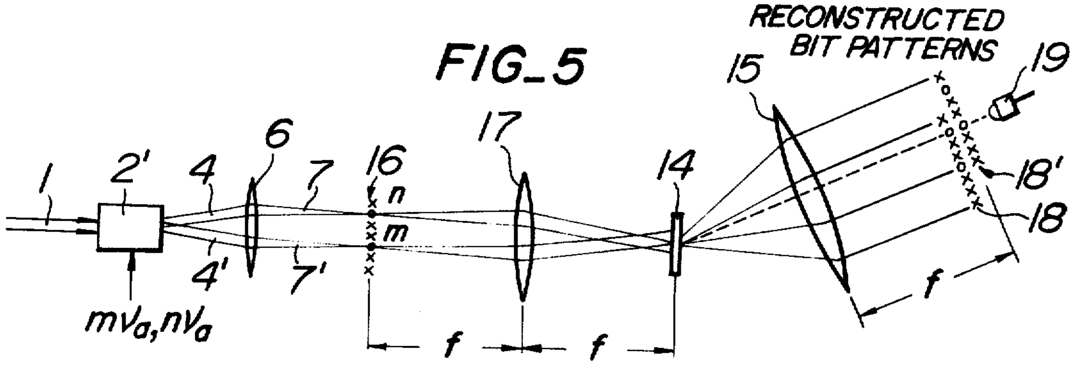
FIG. 5 shows a schematic view of a character coincidence checking optical system according to the invention.
Figure 6A:
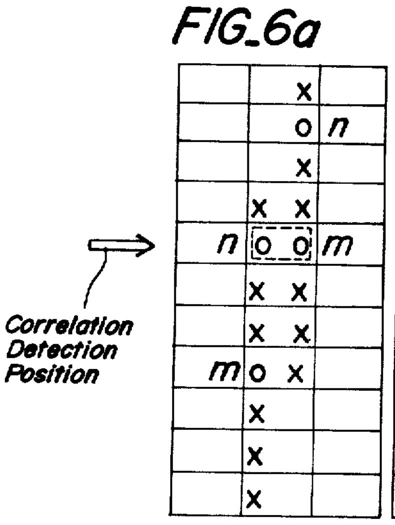
FIG. 6 is a symbolic illustration of various overlapping states of "1" and "0" bits at a predetermined correlation detection point upon checking coincidence matching for various reproduced code patterns, wherein FIG. 6*a* indicates presence of coincidence with two "1" bits being overlapped, FIG. 6*b* indicates absence of coincidence with one "1" bit and one "0" bit being overlapped, and FIG. 6*c* and FIG. 6*d* indicate absence of coincidence with two "0" bits overlapped at the detection point, respectively.
Figure 6B:
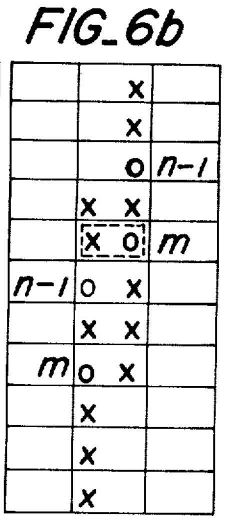
Figure 6C:
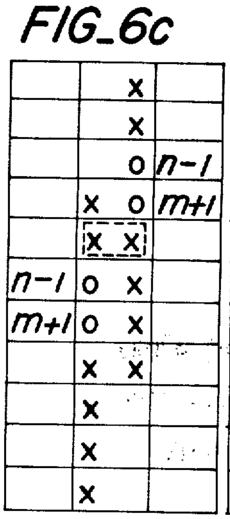
Figure 6D:
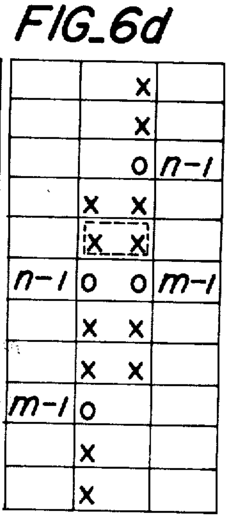

FIG. 5 shows schematically a basic configuration of the coincidence identification optical system according to the invention. An interrogation code 16 is supplied from the acousto-optic deflector 2'. In this figure, the interrogation code which has two 1 bits at the mth and nth bit positions caused by a pair of ultrasonic waves of frequencies *mva* and *nva* is shown as an example of a 2-out-of-N code (wherein N=8). A light pattern of the interrogation code 16 is Fourier-transformed by a Fourier-transform lens 17 and subsequently projected onto a hologram 14. The two deflected light beams 7 and 7' constituting the two 1 bits of the interrogation code 16 illuminate the hologram 14 as reproduction beams to reconstruct double coded hologram memory information. The two deflected beams are incident onto the hologram at different angles so that positions of the two hologram information code patterns reconstructed through an imaging lens 15 deviate from each other transversely in a focal plane of the lens 15 as generally indicated by reconstructed code patterns 18 and 18', respectively. However, if an interrogation code and the coded hologram information coincide, the two reconstructed code patterns provide overlapping of one 1 bit in each of these two code patterns. A position at which said overlapping occurs is fixed irrespective of type of code used and thus can be utilized as a correlation detection position at which a light-sensitive element such as a photo diode 19 may be placed to detect a bit light that indicates overlapping of two 1 bits and hence presence of coincidence. On the other hand, when an interrogating code and the coded hologram information do not coincide, overlapping of any two 1 bits does not appear at the correlation detection position.

FIG. 6 shows various states of overlapping of 1 bits and 0 bits at the correlation detection position (as indicated by an arrow → ) when the coincidence identification of various hologram information codes having 1 bits at the *n*- and m-th, the (*n*−1)- and m-th, the (*n*−1)- and (*m*+1)-th and the (*n*−1)- and (*m*−1)-th bit positions is effected with respect to the interrogation code having 1 bits at the n- and m-th positions. FIG. 6*a* shows a state in which two 1 bits superimpose each other at the correlation detecting position to indicate a presence of coincidence. In FIG. 6*b* one 1 bit and one 0 bit overlap each other to show existence of non-coincidence. Similarly, in FIGS. 6*c* and 6*d* two 0 bits overlap and show a state of non-coincidence, respectively. Magnitude in the output of the photo diode 19 represents degree of correlation between checked codes, and it has a value of 4 for the case of FIG. 6*a* and a value of 1 for the case of FIG. 6*b*, while it is zero for both of FIGS. 6*c* and 6*d*. In the known method of correlation detection, such differences in the output of the photo diode are discriminated so that coincidence or non-coincidence between checked codes may be identified. However, according to the invention, coincidence identification is carried out as described hereinbelow.

Assuming that two deflected light beams which form an interrogation code are produced by a pair of ultrasonic waves of respective frequencies *mva* and *nva*, two 1 bit light beams which overlap upon coincidence when reproduced by the correspondingly deflected beams have a frequency difference of (*n*−*m*)*va*. If the two light beams having such a frequency difference are detected by a square-law element such as a photo diode 19, a beat output of the two light beams having the frequency difference (*n*−*m*)*va* as a beat frequency is obtained at the output of the photo diode by well-known optical heterodyne phenomena. Since upon non-coincidence it does not happen that two light beams of different frequencies are detected, no beat output is produced by the photo diode for the cases of FIGS. 6*c* and 6*d* and only a D.C. current proportional to the intensity of the input light is generated from the photo diode for the case of FIG. 6*b*. As mentioned above, result of identification appears in the form of a beat output including an A.C. current upon coincidence and in the form of a D.C. current or no output upon non-coincidence, so that, in the present coincidence identification system, coincidence or non-coincidence between interrogating and interrogated codes is determined by identifying presence or absence of an A.C. current in the output derived from the checking operation of coincidence matching instead of by the magnitude or intensity of identification result.

FIG. 7 illustrates a block diagram of a coincidence identification electric circuit for a 2-out-of-N code which detects an A.C. component to discriminate any coincidence output. Detection of an alternating current can easily be carried out in a manner such that identification output from a light-sensitive element 19' is amplified by an amplifier 20 and suppllied to a high-pass filter 21 so as to eliminate any direct current and enable an alternating current to be derived from the output of the photo diode 19'. The derived A.C. output is converted by a detector 22 and a threshold element 23 into a D.C. voltage or current output which indicates presence of coincidence.

The magnitude of the output of coincidence matching is liable to be influenced by variations in diffraction efficiency of a hologram and in output of a laser light source, nonhomogeniety in distribution of strength of the laser beam, etc., and thus the known correlation detection method may often result in erroneous detection, thereby providing poor reliability. However, in the system according to the invention, coincidence matching is discriminated by detecting presence or absence of any A.C. component in the output of the light receiving element, and this renders coincidence matching of a very high accuracy possible and enables coincidence matching detection of information having higher reliability than that of the known method.

When an M-out-of-N code is used, the number M of reconstructed code patterns of the hologram memory information codes are obtained by the number M of deflected lights constructing an interrogation code. Therefore, upon coincidence the M 1 bit lights are superimposed at the correlation detection point so that a plurality of beat outputs caused by any pair of M 1 bit lights having different frequencies are produced at the output of the photo diodes 19 and 19'. The number of such beat outputs can be derived by calculating combinations $MC_2$ - i.e., combinations of 2 out of M. The number of these combinations is equal to M(M−1)/2, which includes all the beat outputs caused by pairs of 1 bit lights with the same frequency difference and having the same beat frequencies. Upon noncoincidence with the M-out-of-N code, the number (M−1) of 1 bits are superimposed is maximum, and beat outputs are produced as in the case of coincidence. The maximum number of such beat outputs is given by (M−1)-(M−2)/2. Thus, presence of coincidence between interrogating and interrogated codes is recognized if at least the number [(M−1)(M−2)/2]+1 of beat outputs having different frequencies are detected in identified outputs from the photo diode.

In the case of M=3, three beat outputs at maximum are generated upon coincidence. A condition may occur where two of the three beat frequencies are identical, but beat outputs having at least two different frequencies can be obtained. However, upon non-coincidence only one beat output at maximum appears. Accordingly, presence of coincidence matching between interrogating and interrogated codes is recognized if at least two beat outputs having different frequncies are detected in identified outputs from the photo diode. As seen from the foregoing, any existing frequency analysis technique can be applied to check the identification outputs which require frequency analysis.

FIG. 8 shows diagrammatically a general construction of an identification circuit of coincidence checked output for use in an M-out-of-N code. 24 denotes a frequency analyzer having frequency analysis channels numbered from 1 to (M−1)(M−2)/2 + 1, and 25 is an AND circuit. Each frequency analysis channel detects one particular frequency out of (M−1)(M−2)/2 + 1 different frequencies.

If the number (M−1)(M−2)/2 + 1 of beat frequencies are detected in a coincidence checked output, it is identified as existence of coincidence. For a given interrogation code, each frequency and its beat output upon coincidence is predetermined. In this regard a coincidence checked output is divided by a number equal to that of the number of frequencies to be detected so that the divided outputs may be compared with each beat frequency occuring at the time of coincidence. After comparison and checking in frequency, each of the divided identification outputs is fed to the AND gate 25. The AND gate is designed to indicate presence of coincidence only when the divided outputs comprise all of the matching frequencies associated therewith.

In the case of a 3-out-of-N code, a checked output can be discriminated by an electric circuit of simple construction with limitations imposed on the 3-out-of-N code used. At the time of coincidence three beat outputs are generated, and subsequently the three beat outputs are further supplied to a frequency mixer to derive another or second three beat outputs from the first three beat outputs. The frequency mixer provides the second three beat outputs, while the codes to be used are limited to 3-out-of-N codes such that one of the corresponding three beat frequencies of the second three beat outputs is always constant. This beat output having a constant frequency is applied to a band pass filter to separately extract it so that a coincidence chacked output is identified.

Now, it is assumed that a 3-out-of-N code is represented by three ultrasonic waves of frequencies $m_1\nu a$, $m_2\nu a$, and $m_3\nu a$ (wherein $m_1$, $m_2$, $m_3$=1, 2, . . . N and $m_1<m_2<m_3$). Then, upon coincidence the first three beat frequencies of the first beat outputs appearing at the output of the photo diode are $\nu_{12}=(m_2 3I\ m_1)\nu a$, $\nu_{23}=(m_3-m_2)\nu a$, and $\nu_{31}=(m_3-m_1\nu a$, respectively. When the three beat outputs having these three frequencies $\nu_{12}$, $\nu_{23}$, and $\nu_{31}$ are supplied to the frequency mixer, it produces at its output second three beat frequencies $\nu_{12} \sim \nu_{23}$, $\nu_{23} \sim \nu_{31}$ and $\nu{-}{\sim}\ \nu_{12}$, respectively. Values of $m_1$, $m_2$ and $m_3$ are chosen so that one of these second three beat frequencies becomes constant. However, even upon non-coincidence it is possible to generate, at most, one beat output and, if that beat output is fed to the frequency mixer, its higher harmonic, which may prevent an output of a constant frequency indicating coincidence from being detected. As a result, it is suitable to select a minimum beat frequency $\nu a$ for the constant frequency so that it is not influenced by checked outputs upon non-coincidence.

FIG. 9 is a table of a 3-out-of-8 code in which a plurality of codes that provide an identification beat frequency $\nu a$ are shown, wherein o marks represent binary 1 bits and × marks binary 0 bits, respectively.

Figure 10:
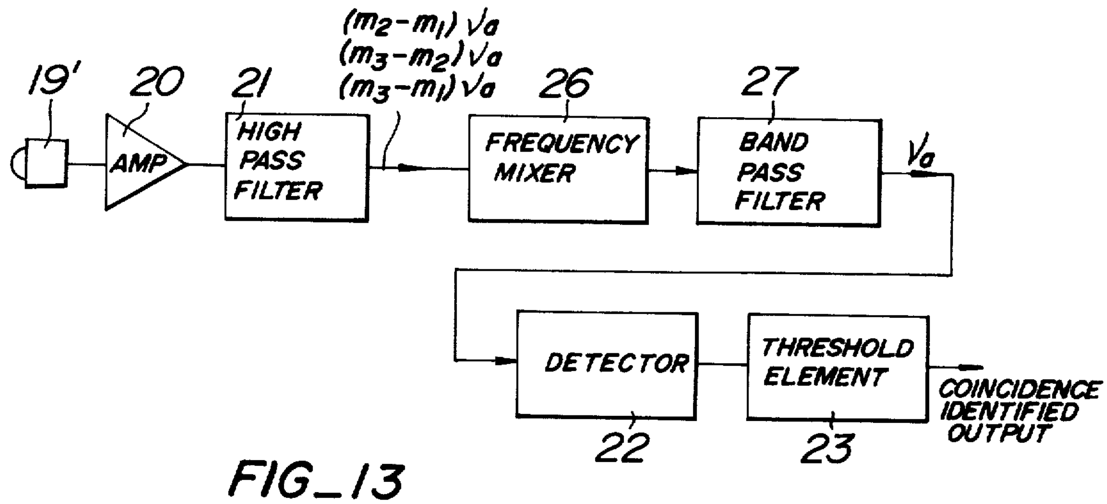
FIG. 10 is a block diagram of an identification circuit of coincidence matching detection output in case of a 3-out-of-N code being employed.

FIG. 10 is a block diagram of an identification circuit for detecting an identification frequency $\nu a$. In this figure, 26 is a frequency mixer and 27 a band pass filter. Generally, the number of 3-out-of-N codes obtained when the limitations of $m_1$, $m_2$ and $m_3$ are imposed as previously mentioned is defined by the following relation $$(N-4)(3N-10)/2$$

with N being an even number and $$(N-3)(3N-13)/2$$

with N being an odd number, wherein N must be larger than five.

In the foregoing, the method of providing interrogation codes to effect a coincidence identification has been described. Embodiments of apparatus according to the invention for carrying out said method will be explained hereinbelow. For convenience, a 2-out-of-N code is referred to; however, it is apparent to those skilled in the art that explanation for that code can also apply to an M-out-of-N code.

Figure 11:
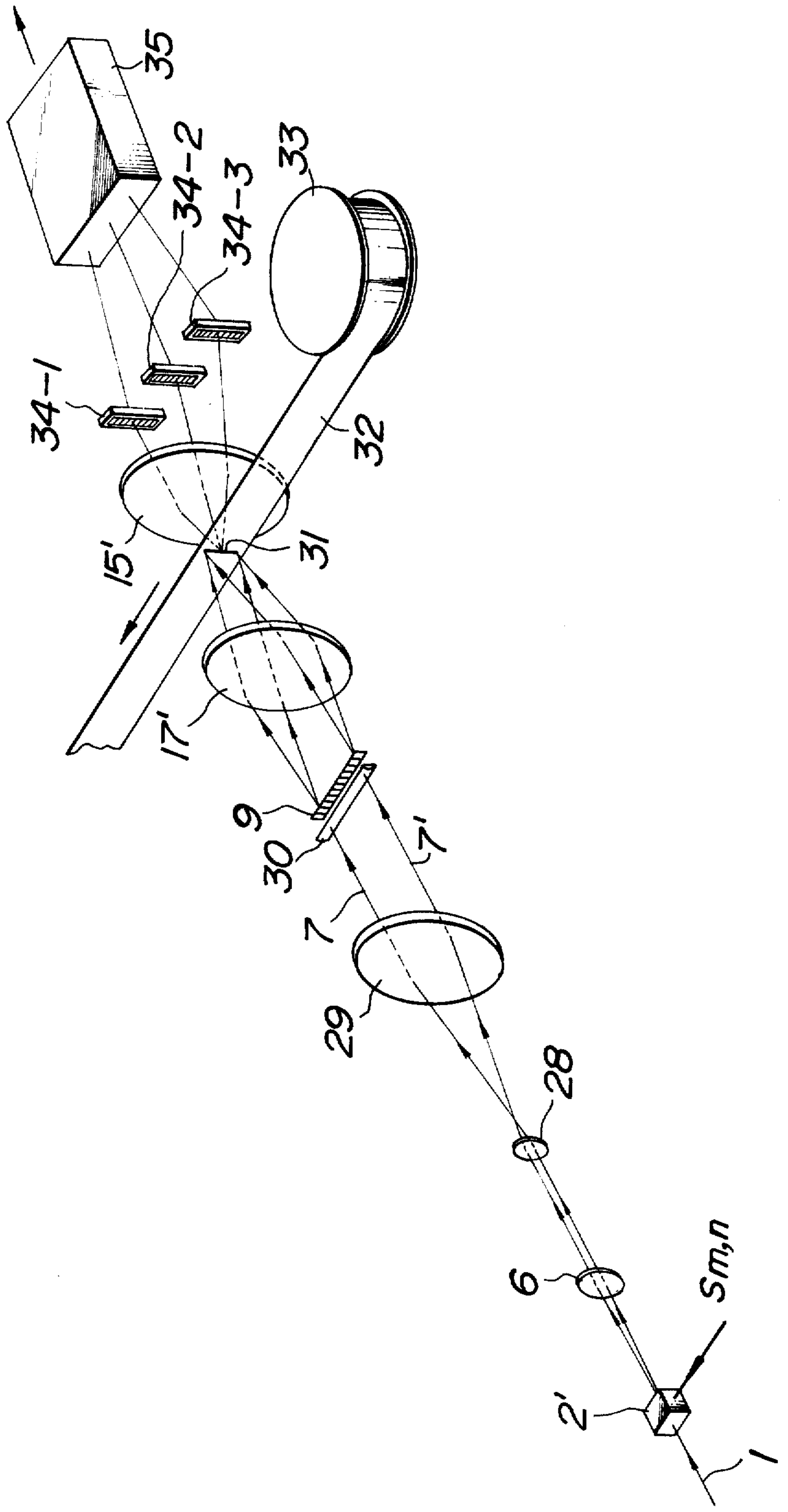
FIG. 11 is a schematic view of an embodiment of the invention for generating an interrogation code pattern by means of an acousto-optic deflector for retrieval of codes information stored on a hologram tape.

FIG. 11 shows schematically an embodiment of the invention wherein an acousto-optic deflector is used as an interrogation signal encoder. In this figure, 1 is a laser light, 2' an acousto-optic deflector comprising an ultrasonic wave propagation medium 2, and 6 a lens for transforming an angular deflection light beam to a positional deflection light beam. 28 and 29 are lenses of short and long focal lengths, respectively, for increasing mutual-distance and size of deflected light spots. 7 and 7' are two deflected light beams which represent 1 bits of the 2-out-of-N code. 30 is a cylindrical lens to diffuse the deflected beams in the vertical direction with respect to the deflection direction viewed in the drawing, and 9 is a mask member that functions in a manner similar to the mask 9 in FIG. 1. 17' is a Fourier-transform lens for optically Fourier-transforming a 2-out-of-N code pattern projected onto and passed through the mask 9, the latter being located at a focal plane of the lens 17' upstream thereof. 31 is a Fourier-transformed light pattern or Fraunhofer diffraction light pattern of a 2-out-of-N code, which is a band shaped diffraction light pattern stretched in one direction due to diffusion effect by the cylindrical lens 30. 32 is a film on which information to be retrieved has been recorded in the form of a hologram matrix, which film will be referred to a hologram tape hereinafter.

33 is a reel on which the hologram tape is wound. 15' is an imaging lens with which coincidence checking output lights resulting from illumination of one row of the hologram matrix by a diffracted light of the interrogation signal are concentrated separately in space onto a series of light-sensitive elements 34-1, 34-2 and 34-3. 35 is an electric circuit which discriminate A.C. components from the outputs of said light-sensitive elements. The embodiment of FIG. 11 is substantially the same as that of FIG. 1 and differs from the latter only in the fact that a deflection enlarging lens system 28, 29 is added to the optical system for coding interrogation signals by the acousto-optic deflector 2' as compared with the apparatus shown in FIG. 1.

Figure 12:
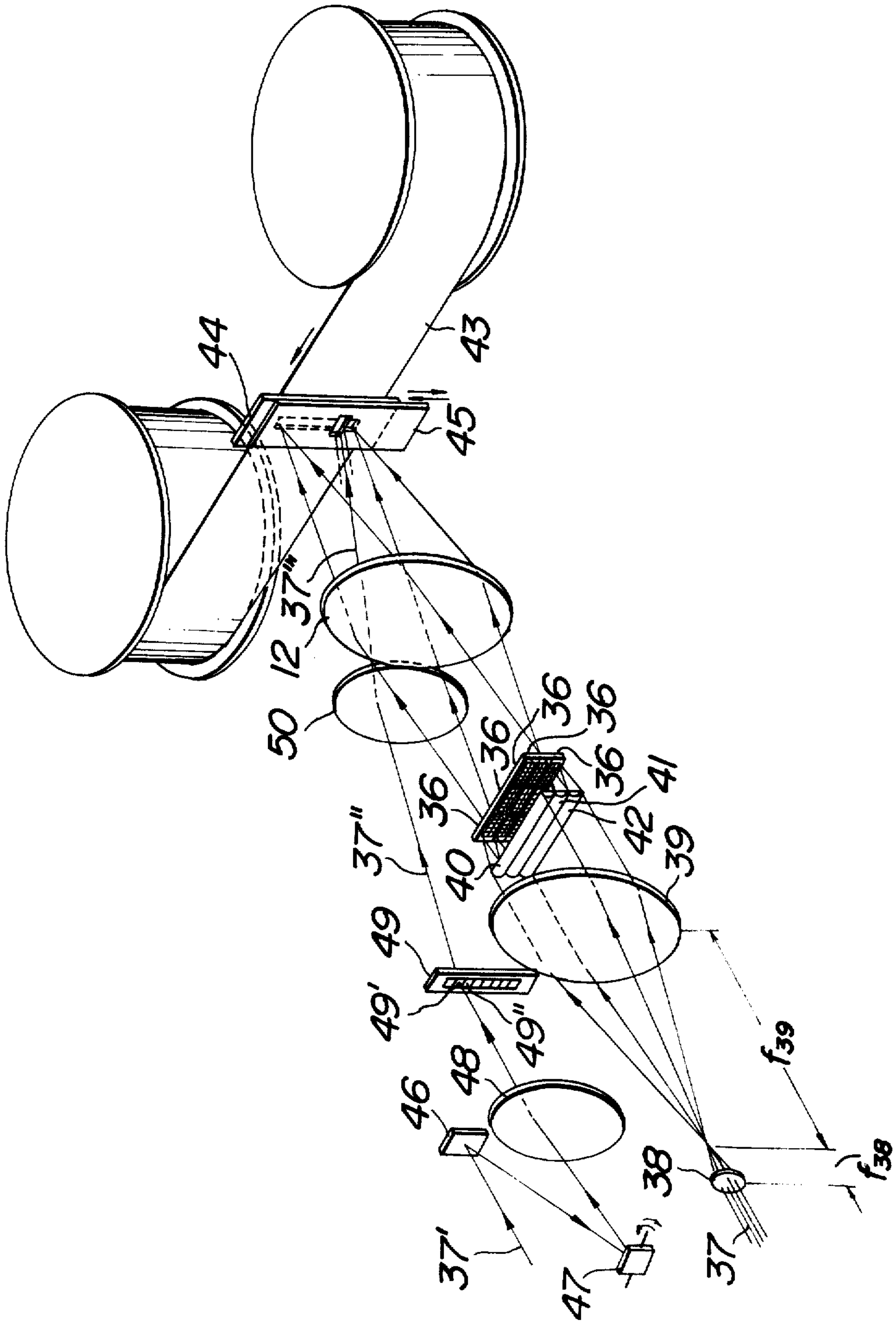
FIG. 12 is a schematic illustration of method of providing holograms on a tape to be used with the apparatus according to the invention.

FIG. 12 illustrates schematically an example of an optical device for preparing the hologram tape 32. It is assumed that this optical device operates to record nine 2-out-of-N codes in one micro hologram at a time. However, it should be noted that more or less 2-out-of-N codes can also be recorded in one micro hologram simultaneously. In information retrieval, each of the 2-out-of-N codes serves as a unit of information to represent alphabetical characters, numerals, special symbols, etc. Thus, a 2-out-of-N code that is a unit of information will be referred to a character hereinbelow.

In FIG. 12, 36 is a shutter array for coding information to be stored in the form of a 2-out-of-N code, i.e., a character. The shutter array 36 comprises N shutters which control passage of lights therethrough by closing or opening of the shutters under electrical control signals therefor. In order to represent a character in the form of a 2-out-of-N code, two shutters which are chosen from the N shutters corresponding to the character to be encoded are opened while the remaining ones are closed. In FIG. 12, nine shutter arrays for representation of nine characters are arranged in a matrix form of three columns and three rows. The diameter of a laser light 37 is enlarged through a lens system 38, 39, and the light impinges onto a set of three cylindrical lenses 40, 41 and 42. $f_{38}$ and $f_{39}$ designate focal lengths of the lenses 38 and 39, respectively. In the following description, similar notations are used. The three cylindrical lenses 40, 41 and 42 are disposed so that each of them faces a corresponding row of three shutter arrays in succession as shown. The nine shutter arrays 36 are located in the focal planes of the cylindrical lenses 40, 41, and 42 downstream thereof. With such a configuration, the laser beams focussed in a transverse-linear band shape by the lenses 40, 41, and 42 are directed onto the three rows of shutter arrays, respectively. The light beams passed through the shutter arrays travel with diffusion in one direction and impinges onto a light-sensitive film 43 through a Fourier-transform lens 12. The film 43 may be composed of, for example, a silver-halide photographic film, a film coated with light-sensitive resin such as photo resist, etc.

The resultant beam incident onto the light-sensitive film 43 is in the form of a band shape stretched in one direction by the aforementioned effect of the cylindrical lenses 40, 41, and 42, and forms in its direction of width a Fraunhofer diffraction pattern of the respective shutter arrays; in other words, it shows distribution of intensity caused by superimposition of optically Fourier-transformed patterns. Such Fraunhofer diffraction patterns stretched in one direction are called signal lights in holography, and FIG. 12 shows schematically a device for providing a hologram of the Fourier-transform type. Consequently, the shutter arrays 36 are placed in an upstream focal plane of the lens 12 and the film 43 is arranged at a position where Fraunhofer diffraction patterns are formed.

44 is a fixed slit, which is arranged suitably so that a portion of the film 43 larger than the width of the slit is not exposed to an incident light at a time. 45 is a slit for parallel displacement that can move vertically, i.e., in the direction of width of the film 43. These two slits 44 and 45 in combination determine the area on the film 43 exposed by the light at a time, that is, size of a micro hologram. For a reference light to construct a hologram by interference with a signal light incident onto the film 43, the embodiment of FIG. 12 employs a reference light that is incident onto the film 43 at different angles corresponding to various positions in the direction of width of the film where micro holograms should be formed. 37' is a laser light which is derived from the same laser light source as that of the laser light 37. 46 is a light path modifying mirror, and 47 is a mirror rotating about a horizontal axis. These elements may comprise a galvanometer of a type commonly used in electro-magnetic oscillographs. The mirror 47 is mounted on a small turn of coil, usually consisting of one turn, and it is caused to deflect or vibrate around its axis by a force produced by the interaction of the applied current and the static magnetic field. The laser light deflected in angle by the rotating mirror 47 is converted into a positionally deflected light by means of a lens 48, and impinges onto a diffraction grating array 49. The diffraction grating array 49 consists of an array of small-sized diffraction gratings which are equal in number to the number of micro holograms to be formed on the film 43 in the direction of its width. FIG. 12 illustrates schematically a condition in which one of the diffraction gratings 49′ is irradiated selectively through rotational movement of the rotating mirror 47, thereby resulting in a diffracted light 37″. The diffracted light 37″ is reconverted into an angle-deflected light by passing through a lens 50, and it is then projected through the combined fixed and movable slits 44 and 45 onto the film 43 as a reference light 37‴. The latter interferes with the signal light so that the film 43 is exposed through the slits 44 and 45 by an interference pattern corresponding to a coding pattern of the shutter arrays. After completion of exposure of one micro hologram, the coding pattern of the shutter arrays is changed as required, and the rotating mirror 47 is driven so that the next diffraction grating 49″ is chosen to change the incident angle of the reference light in order to effect the next exposure for making a new micro hologram. Upon successive exposure of the film 43 in the direction of its width, the vertically moving slit 45 moves to corresponding positions in sequence where micro holograms should be provided. Recording of holograms in the longitudinal direction of the film 43 is carried out by sequentially feeding the film in its longitudinal direction. Referring to FIG. 12, the reason why the light diffracted by the diffraction grating array 49 is used instead of direct utilization of the light deflected in angle by the rotating mirror 47 to obtain the reference light at different angles is that, if a galvanometer or the like is employed for the rotating mirror 47, direct use of the angle-deflected light produced thereby causes the angle of the mirror 47 to fluctuate very slightly with time upon making the hologram, and this may result in disturbing production of the hologram or untolerable degradation in diffraction efficiency of the produced hologram due to variation of interference patterns in the film 43 between the signal light and the reference light with time. Especially, transient fluctuations of the rotating mirror which occur when the mirror changes its direction of movement cause adverse effects. For solution of this problem, it is sufficient to start the relevant exposure after the vibration of the rotating mirror has fully damped. However, this is impractical because a very longer time period in total is required when a large number of holograms should be prepared. Individual portions of the lens 50 onto which the diffracted lights from the reference micro diffraction gratings 49′, 49″ . . . impinge are constant and hence the incident angles of these diffracted lights are also fixed. For any slight deviation in spatial position of the lights incident onto the micro diffraction gratings 49′, 49″ . . . due to transient fluctuations in rotating angle of the mirror 47, if the diameter of the incident beam is chosen to a value such that the beam always covers fully a single micro diffraction grating a diffracted beam which is fixed in position corresponding to that of a micro diffraction grating is produced, so that a reference light without fluctuations in angle of incidence can be generated, thereby resulting in a decrease of the time period necessary for hologram production and a stabilization of the properties of the holograms produced. In FIG. 12, a diffraction grating of the transmission type is illustrated, however, similar function and effect may be realized by using a diffraction grating of the reflective type.

Of course, it is not necessary to employ a diffraction grating when a light deflector is obtained which does not cause fluctuations in the predetermined angles upon producing the reference light at different angles as described above, when the ratio of the time period during which transient fluctuations in angle converges to the very small value to a time period for making the hologram is small, or when the time period for production of the hologram is so short that such fluctuations in angle have no influence, as in the case of making the hologram by using a pulse laser.

Figure 13:
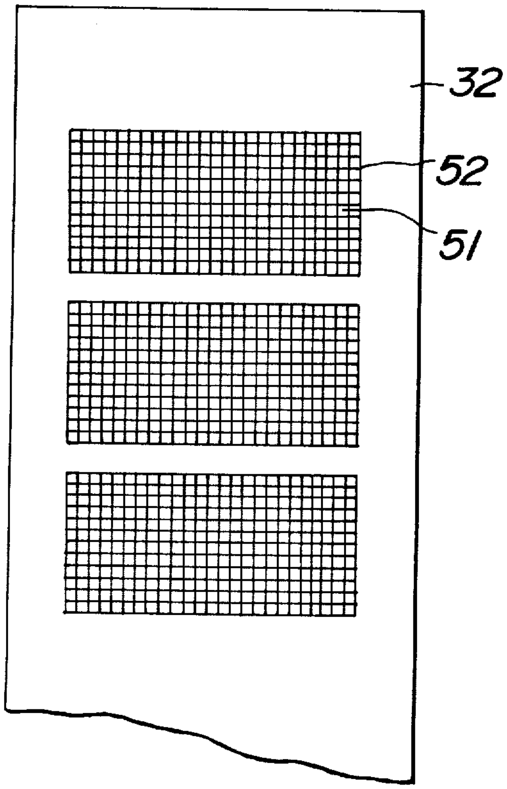
FIG. 13 is a schematic view of hologram array groups on a photographic film.

FIG. 13 shows an example of part of a hologram tape 32 prepared by the recording apparatus of FIG. 12 for making a hologram. 51 denotes a single micro hologram, and a predetermined number of such micro holograms are arranged in row and column to form a hologram block or matrix as indicated by 52. A plurality of such hologram blocks are provided on the tape or film in spaced relation in its longitudinal direction, and hereinafter each column or sequence of micro holograms in the longitudinal direction of the film in the respective hologram blocks will be referred to a track. It should be noted that in FIG. 13 the hologram tape is shown as made in the form of sequential blocks; however, this is based on one type of hologram memory information or information retrieval method, and such a block structure of micro holograms is not essential for the correlation detection system according to the invention.

Referring to the embodiment shown in FIG. 11 again, coincidence detection carried out thereby according to the invention will be explained below.

A 2-out-of-N code $S_{m,n}$ defined by two ultrasonic frequencies *mva* and *nva* modulates the incident laser beam 1 at the acousto-optic deflector 2′ to form an interrogation character signal, and then its Fourier-transform pattern produced through the lens system 6, 28 by the Fourier-transform lens 17′ is projected onto the hologram tape 32. The Fourier-transform pattern 31 of the interrogating character signal is in a vertically narrow band shape so that it can irradiate all tracks of a single hologram block over the hologram tape 32 simultaneously. Previously the holograms Fourier-transform patterns of the interrogated character were recorded in the form of a 2-out-of-N code. As a result, a light beam of amplitude proportional to the product of the Fourier-transform patterns of the character information stored in the hologram and that of the interrogation character incident onto the hologram appears in the output light beam passed therethrough. A coincidence identification output beam for each track occurs in spatially separated manner due to difference in diffraction angles caused by the fact that various reference light beams having different incident angles have been applied for respective tracks upon making the hologram. The imaging lens 15′ serves to convert angle-deflected identification output beams for each track into positionally deflected ones so that they are focussed onto each element of light-sensitive element arrays 34-1, 34-2, and 34-3. These three light-sensitive element arrays 34-1, 34-2, and 34-3 correspond to three rows of shutter arrays 36 in the horizontal direction in the shutter array assembly which is used for preparation of the hologram as illustrated in FIG. 12. The number of light-sensitive elements to be included in each of the light-sensitive element arrays 34-1, 34-2, and 34-3 is equal to the product of the number of tracks in one hologram block and the number of columns in the assembled shutter arrays upon production of the hologram as shown in FIG. 12. Coincidence checked output light beams for each track appear at different angles which respect to one another, and, moreover, each of the coincidence checked output light beams comprises coincidence checked outputs corresponding to characters over three columns separated in angle. In the manner mentioned above, respective coincidence checked outputs of each character resulting from all the tracks of the hologram tape irradiated by the diffraction pattern 31 of the interrogation character are focussed onto corresponding element of the light-sensitive element arrays 34-1, 34-2, and 34-3, respectively, and consequently detected thereby.

In the coincidence checking system in FIG. 11, information retrieval operation is carried out in a manner such that successive character information which constitute interrogation signals or words to be retrieved is applied one by one to the acousto-optic deflector 2′ in the form of a 2-out-of-N code $S_{m,n}$ defined by a pair of ultrasonic frequencies *mva* and *nva*, and subsequently only hologram groups indicating presence of coincidence are read out simultaneously. During the above operation the hologram tape 32 is advanced sequentally so that coincidence identification is effected one-by-one in each row of the hologram blocks arranged in the direction of width of the film. For simplicity an optical system for reading out the information recorded in the hologram to be interrogated is not shown in the embodiment of FIG. 11.

With respect to the preferred embodiments a coincidence checking process has been described under the condition that the Fourier-transform patterns of interrogation signals and the hologram are stationary, however, hereinafter a further coincidence checking process will be explained which is achieved by scanning the hologram by Fourier-transform patterns of interrogation characters at a constant speed V under condition of their relative movement. The latter condition may be realized generally in two methods; in the first method an interrogation signal light is fixed while the hologram is advanced at a constant speed, and in the second method the hologram is fixed during a relevant coincidence identification so that the hologram is scanned by deflecting a Fourier-transform pattern of an interrogation character at a constant speed. A preferred embodiment for carrying out the second method will be explained hereinbelow by referring to the drawings. In my aforementioned U.S. Patent, it is essential to scan the hologram by diffraction patterns from the interrogation shutter array for representing the 2-out-of-N code so that the coincidence A.C. output can be obtained; however, according to this invention, scanning of the hologram is not necessarily required for providing a coincidence A.C. output. Another embodiment of a coincidence checking system according to the invention is shown in FIG. 14, wherein the hologram is scanned during the coincidence checking process.

Figure 14:
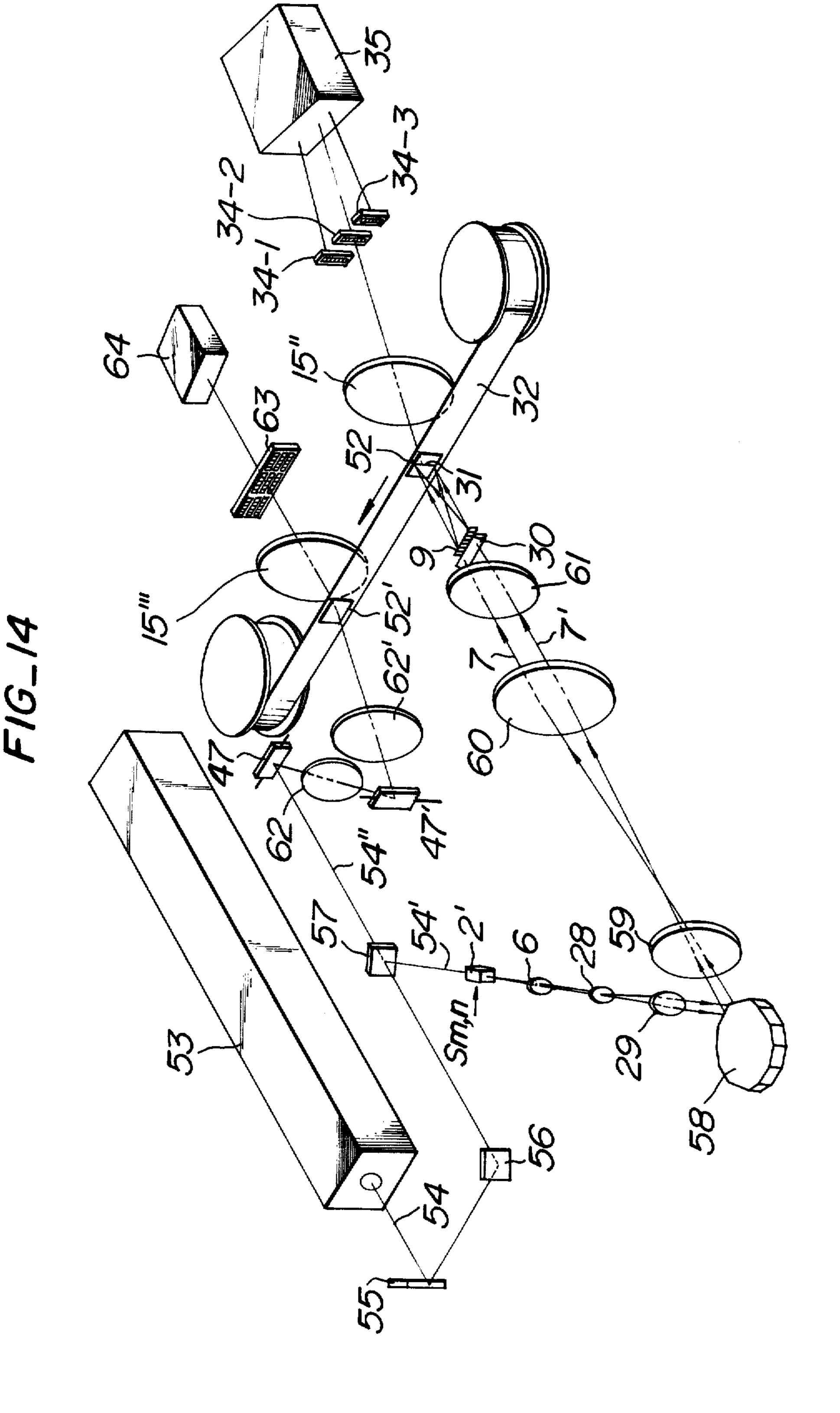
FIG. 14 is a schematic view of another embodiment of the invention which comprises a character coincidence checking optical system to effect the correlation detection by scanning a hologram tape with the interrogation signal light and a second optical system downstream of the first optical system for reading-out identified information from the hologram tape, both of these optical systems being controlled by a central control unit not shown.

In FIG. 14, numeral 53 designates a laser light source, 54 a laser light, and 55 and 56 light path modifying mirrors, respectively. 57 is a translucent mirror which splits the laser light 54 into two light beams 54′ and 54″ so that the beam 54′ is directed to a coincidence checking system and the beam 54″ to a hologram information read-out system, respectively. 2′ is an acousto-optic deflector similar to that in FIG. 11 which comprises an ultrasonic wave propagation medium 2 for modulating the incident beam 54′ by an interrogation character $S_{m,n}$ to a 2-out-of-N code defined by two ultrasonic frequencies *mva* and *nva*. 6 is a lens as in FIG. 11 for converting angle deflected beams into positional deflected beams, and 28 and 29 are lenses of short and long focal lengths, respectively, and have the same function as that of the lens system 28, 29 in FIG. 11. 58 is a rotating mirror of polyhedron type. The two deflected light beams from the lens 29 are subjected to another deflection in angle through a segment of the mirror 58 rotating at a predetermined constant speed. 59 and 60 are lenses of short and long focal lengths, respectively, and constitute a combined lens system similar to the lens system 28, 29 which serves to increase the diameter of the deflected light beams. 30 and 9 are a cylindrical lens and a mask, respectively, and they have the same functions as those in FIG. 11. 61 denotes a beam concentrating lens which acts so as to project a Fourier-transform pattern of the coded interrogation signal $S_{m,n}$ represented by the two deflected light beams 7 and 7′ onto the hologram tape 32. Numeral 31 designates a diffracted pattern of the interrogation character signal $S_{m,n}$ which was stretched in a narrow band shape through action of the cylindrical lens 30. Upon rotation of the rotating mirror 58 the diffracted pattern 31 scans a hologram block 52. Coincidence checked output light beams from the hologram block are focussed through an imaging lens 15″ onto the light-sensitive element arrays 34-1, 34-2, and 34-3, their outputs being fed to a coincidence identification circuit 35 to detect an A.C. output representing presence of coincidence. The hologram tape 32 is advanced intermittently, so that hologram blocks in which presence of desired information is detected by scanning for coincidence through a series of interrogation character signals are read out at the read-out optical system downstream of said coincidence checking system. 52′ shows a hologram block to be read out, and 47 and 47′ are two rotating mirrors. 62 is a lens which converts a light beam which has been angularly deflected by the rotating mirror 47 into a positionally deflected light beam on the rotating mirror 47′. Similarly, 62′ is a lens for reconverting an angle-deflecting action obtained by the rotating mirror 47′ into a positional deflecting action on the plane of the hologram. In addition, the lens 62′ also serves to reconvert a position-deflected light beam formed on the mirror 47′ by the mirror 47 and the lens 62 into an angle-deflected light beam on the hologram. By means of the rotating mirror 47, the second laser beam 54″ is deflected in the vertical direction on the plane of the hologram, as viewed in the drawing, and selectively irradiates a track to be read out. The rotating mirror 47′ deflects the laser beam horizontally to read out micro holograms in columns along the tracks. A lens 15‴ acts so as to focus a character information reconstructed from the associated micro hologram onto a light-sensitive matrix unit 63. An output from the light-sensitive matrix unit 63 is amplified and shaped in its wave forms by a read-out circuit means 64, and thereafter the output is displayed in the form of an actual character by conventional display devices such as cathode ray tube displays, teletypewriters, etc., under control of a central processing unit not shown.

As I disclosed in my copending U.S. Pat. No. 3,832,698, in the coincidence identification method wherein an interrogation signal is applied in the form of a 2-out-of-N code to a shutter array so that the hologram is scanned by a Fourier-transform pattern of the interrogation signal at a constant speed, upon coincidence an A.C. output having a frequency proportional to the scanning speed is obtained at the output of the light-sensitive elements. Accordingly, in the embodiment of the invention shown in FIG. 14, the frequency of the A.C. component of coincidence checked output is also influenced, of course, by the speed at which the hologram is scanned. In the apparatus disclosed in the aforementioned patent, in which an A.C. output is obtained upon coincidence, it is also considered that such A.C. outputs are produced due to the effect based on optical heterodyne. In this case, the interrogation character pattern is supplied to the shutter array, and frequencies of two 1 bit light beams resulting therefrom have originally the same value. However, when diffracted by the hologram, the two 1 bit beams are subjected to frequency shifts corresponding to positions and scanning speed of each 1 bit by Doppler phenomena due to relative motion between the hologram and the interrogation signal beams. As a result, two 1 bit beams having frequencies which differ slightly from each other due to the frequency shift appear at the correlation detection point, so that their beat output caused by optical heterodyne phenomena is obtained at a photo-electric transducer for detecting it. The frequency of the beat output is proportional to the amount of difference between shifted frequencies of the two 1 bit light beams and proportional to the product of a positional distance between the two 1 bit beams and the scanning speed therefor. Accordingly, when the hologram is scanned in the correlation detection apparatus according to the invention, two frequencies of two 1 bit light beams which were rendered different previously upon coding are added to the effect of frequency shift by scanning the hologram, so that the frequency of coincidence A.C. output is determined by the difference in frequency of two 1 bit light beams at the modulator or encoder and by frequency shifts resulting from scanning the hologram.

The amount of correction $\nu_s$ required by the hologram scanning upon the frequency of a coincidence A.C. output is given in the following relation $$\nu_s = v.d_{m,\ n}/\lambda.f$$

wherein $v$ is a scanning speed, $d_{m,\ n}$ a distance between two 1 bit light spots, $\lambda$ a wavelength of a laser light, and $f$ a distance between the mask 9 and the hologram tape 32 in the optical system shown in FIG. 14.

Under the condition wherein the hologram is being scanned, a frequency $\nu_0$ of a coincidence A.C. output can be expressed by using said $\nu_s$ as follows:

$$\nu_0 = \Delta\nu + \nu_s \text{ or } \Delta\nu \sim \nu_s$$

wherein $\Delta\nu$ is the difference between frequencies of two 1 bit light beams. It is determined by the direction of scanning the hologram whether the frequency $\nu_0$ becomes equal to $\Delta\nu + \nu_s$ or $\Delta\nu \sim \nu_s$.

As seen from the foregoing, in the embodiment of the coincidence checking system including a hologram scanning operation as shown in FIG. 14, discrimination between coincidencee and non-coincidence also can be achieved by detecting presence or absence of an A.C. output.

The apparatus according to the invention can be applied advantageously to retrieve scientific and engineering literatures, patent documents, or judicial precedents, etc., or to a micro film system with which holography technique is utilized in a manner such that retrieval of any desired images can be accomplished for a hologram onto which images have been recorded together with digital information for retrieval.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. An optical information retrieval apparatus comprising a first optical system for checking character coincidence matching and a second optical system for reading out characters detected by coincidence checking at the first optical system so that coincidence matching between an interrogation signal and a hologram memory information character to be retrieved, both represented in the form of an M-out-of-N code, is checked by utilizing the correlation detection function of a hologram, said character coincidence checking optical system comprising in combination:

a. a laser light source for generating a laser light beam;

b. modulator means for coding the laser light beam generated by said laser light source into an M-out-of-N coded interrogation beam pattern including M light beams with different frequencies;

c. optical means responsive to the coded interrogation beam pattern produced by said modulator means for projecting the coded interrogation beam pattern onto hologram memory arrays storing information to be retrieved in the form of the M-out-of-N code used for coding the laser light beam generated by said laser light source;

d. photo-detector array means for producing an electrical output corresponding to the light output resulting from the projection of the coded interrogation beam patterns onto hologram memory arrays; and e. electric circuit means responsive to the electrical output produced by said photo-detector array means for detecting an A.C. component in the electrical output produced by said photo-detector means, whereby the presence of coincidence matching between the code interrogation signal and the coded hologram memory information may be detected.

2. An apparatus as claimed in claim 1, wherein said modulator means comprises an acousto-optic deflector to which M predetermined ultrasonic waves having frequencies $m_1 va$, $m_2 va$, . . . $mMva$ ($1 \leq m_1 < m_2 < \ldots mM \leq N$; $m_1$, $m_2$. . . $mM$: integer) are fed in a manner such that the laser beam generated by said laser light source is modulated to form a deflected light beam pattern including M angle-deflected light beams with different frequencies, which M angle-deflected light beams constitute an interrogation signal in the form of an M-out-of-N code.

3. An apparatus as claimed in claim 1, wherein the M light beams with different frequencies constituting the M-out-of-N coded interrogation beam pattern into which the laser light beam generated by said laser light source is coded by said modulator means are angle-deflected and wherein said character coincidence optical system further comprises, in combination, a converter lens means for converting the M angle-deflected laser light beams of the coded interrogation beam pattern produced by said modulator means into position-deflected laser light beams; a pair of lenses having short and long focal lengths, respectively, arranged behind said converter lens means for increasing the distances between the position-deflected laser light beams; cylindrical lens means for diffracting the position-deflected laser light beam pattern in a direction normal to its deflection; mask means facing said cylindrical means and having N apertures for interrupting spurious light beams other than the position-deflected laser light beams corresponding to the interrogation signal; Fourier-transform lens means responsive to the position-deflected laser light beams from said mask member for irradiating a medium storing the coded hologram memory arrays to be retrieved; and imaging lens means disposed behind said hologram information storing medium.

4. An apparatus as claimed in claim 1, wherein said electric circuit means comprises an amplifier for amplifying, the electrical output from said photo-detector array means, a high-pass filter connected to the output of said amplifier, a frequency analyzer connected to the output of said high-pass filter, and an AND gate coupled to said frequency analyzer so as to be enabled by its respective outputs to provide a coincidence identification output when presence of coincidence is detected between the interrogating and interrogated codes.

5. An apparatus as claimed in claim 1, wherein the value of M is 3 and said electric circuit means comprises, in series,, an amplifier driven by said photodetector array means, a high pass filter, a frequency mixer, a band-pass filter, a detector, and a threshold element.

6. A character coincidence checking optical system for an optical information retrieval apparatus comprising, in combination:

a. a laser light source for generating a laser light beam;
b. an acousto-optic deflector for modulating the laser light beam generated by said laser light source into a coded light beam pattern of angle-deflected light beams in the form of a 2-out-of-N code;
c. a lens for converting the coded angle-deflected light beams into light beams deflected positionally;
d. a pair of lenses having short and long focal lengths, respectively, for increasing the distance between the positionally deflected light beams;
e. a cylindrical lens for diffusing the positionally deflected light beams in a direction normal to the direction of deflection;
f. a mask member having N apertures for interrupting spurious light beams;
g. a lens for effecting optical Fourier transformation of the positionally deflected light beam pattern passed through said mask member, whereby a Fourier-transformed light beam interrogation pattern may be caused to impinge onto a medium storing coded holgram memory information to be retrieved;
h. an imaging lens arranged behind the position of the coded hologram information storing medium during use of the system;
i. light-sensitive element arrays each comprising a plurality of photo-diodes responsive to an optical output from the imaging lens to provide a corresponding electrical output; and
j. electric circuit means including in series an amplifier, a high-pass filter, a detector, and a threshold element to detect the output of said light-sensitive element arrays and to extract A.C. components indicating presence of coincidence between the interrogating and interrogated codes.

* * * * *